United States Patent
Muthiah et al.

(10) Patent No.: US 11,537,303 B1
(45) Date of Patent: Dec. 27, 2022

(54) DISSIMILAR WRITE PRIORITIZATION IN ZNS DEVICES

(71) Applicant: Western Digital Technologies, Inc., San Jose, CA (US)

(72) Inventors: Ramanathan Muthiah, Bangalore (IN); Rakesh Balakrishnan, Bangalore (IN); Eldhose Peter, Bangalore (IN); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/338,487

(22) Filed: Jun. 3, 2021

(51) Int. Cl.
  *G06F 12/00* (2006.01)
  *G06F 3/06* (2006.01)
  *G06F 12/02* (2006.01)

(52) U.S. Cl.
  CPC .......... *G06F 3/0635* (2013.01); *G06F 3/0619* (2013.01); *G06F 3/0625* (2013.01); *G06F 3/0652* (2013.01); *G06F 3/0659* (2013.01); *G06F 3/0679* (2013.01); *G06F 12/0246* (2013.01); *G06F 2212/403* (2013.01); *G06F 2212/7201* (2013.01); *G06F 2212/7211* (2013.01)

(58) Field of Classification Search
  CPC .... G06F 3/0635; G06F 3/0619; G06F 3/0625; G06F 3/0652; G06F 3/0659; G06F 3/0679; G06F 12/0246; G06F 2212/403; G06F 2212/7201; G06F 2212/7211
  USPC ....................................................... 711/154
  See application file for complete search history.

(56) References Cited

U.S. PATENT DOCUMENTS

| 10,379,742 | B2* | 8/2019 | Smith | G06F 3/0644 |
| 2017/0220264 | A1* | 8/2017 | Sokolov | G06F 3/0676 |
| 2020/0241804 | A1* | 7/2020 | Danilov | G06F 3/067 |
| 2020/0356306 | A1 | 11/2020 | Subbarao | |

(Continued)

FOREIGN PATENT DOCUMENTS

| CN | 111124305 A | 5/2020 |
| CN | 111240601 A | 6/2020 |
| CN | 111694515 A | 9/2020 |

OTHER PUBLICATIONS

Bjorling "From Open-Channel SSDs to Zoned Namespaces," Jan. 23, 2019, 18 pages, <https://www.usenix.org/sites/default/files/conference/protected-files/nsdi19_slides_bjorling.pdf>.

*Primary Examiner* — Mardochee Chery
(74) *Attorney, Agent, or Firm* — Patterson & Sheridan, LLP; Steven H. VerSteeg

(57) ABSTRACT

The present disclosure generally relates to creating new zones in a data storage device in a manner that ensures substantially even workload of the memory device storage locations. The data storage device can guide a host device to select a particular zone to open in zone namespace (ZNS) systems where the host device selects which zone to open. The data storage device tracks the workload of the various storage locations and create zones. The data storage device then provides selected zones having the least used storage locations with the idea of guiding the host device to select the zone having the least used storage locations. Thus, rather than utilizing a randomly selected unopened zone, the host will select, based upon guidance from the data storage device, zones that contain the least utilized storage location. In so doing, generally even workload of the memory device storage locations is achieved.

20 Claims, 6 Drawing Sheets

(56) References Cited

U.S. PATENT DOCUMENTS

| | | | |
|---|---|---|---|
| 2020/0393974 A1 | 12/2020 | Bahirat | |
| 2021/0255803 A1* | 8/2021 | Kanno | G06F 3/0656 |
| 2021/0318820 A1* | 10/2021 | Jin | G06F 3/061 |
| 2022/0035561 A1* | 2/2022 | Ha | G06F 3/0659 |
| 2022/0137858 A1* | 5/2022 | Lee | G06F 3/0679 |
| | | | 711/154 |

* cited by examiner

DISSIMILAR WRITE PRIORITIZATION IN ZNS DEVICES

BACKGROUND OF THE DISCLOSURE

Field of the Disclosure

Embodiments of the present disclosure generally relate to efficient utilization of dies in a zone namespace (ZNS) device.

Description of the Related Art

In data storage devices, logical blocks are formed across physical blocks to increase the hardware (HW) workload efficiency during sequential performances. In ZNS devices, the logical blocks are not formed across an entire set of dies, but rather, a logical zone itself could be a single physical block or a few physical blocks, unlike full-fledged interleaving. Multiple such smaller logical blocks constitute a zoned namespace within the ZNS device. The zoned namespaces in a ZNS device is helpful for data segregation, but may impact performance if all dies/flash interface modules (FIMs) are not used in parallel.

The host device typically has substantial control over the data storage device. Typically, the host device selects the NVMe set/endurance group for zone creation (i.e., zone open and zone append). However, within a NVMe set/endurance group, the host device may not be aware of the workload on physical resources of the data storage device such as dies, flash channel(s), and other storage specific resources such as parity check engines and cache buffers.

Additionally, in a typical ZNS system, the data storage device may act upon the zone commands according to the submission queue, and may not be able to bias the zone commands according to the state of the data storage device itself. Biasing the zone commands according to the data storage device state may optimize resource utilization, thereby increasing the quality of service (QoS) of the system.

Thus, there is a need in the art to efficiently utilize the data storage device resources while maintaining the data segregation benefits of ZNS.

SUMMARY OF THE DISCLOSURE

The present disclosure generally relates to creating new zones in a data storage device in a manner that ensures substantially even workload of the memory device storage locations. The data storage device can guide a host device to select a particular zone to open in zone namespace (ZNS) systems where the host device selects which zone to open. The data storage device tracks the workload of the various storage locations and create zones. The data storage device then provides selected zones having the least used storage locations with the idea of guiding the host device to select the zone having the least used storage locations. Thus, rather than utilizing a randomly selected unopened zone, the host will select, based upon guidance from the data storage device, zones that contain the least utilized storage location. In so doing, generally even workload of the memory device storage locations is achieved.

In one embodiment, a data storage device comprises: a memory device; and a controller coupled to the memory device, wherein the controller is configured to: create an empty zone map, wherein the empty zone map ranks zones within the empty zone map from least utilized to most utilized; send the empty zone map to a host device; and receive a zone open command from the host device.

In another embodiment, a data storage device comprises: a memory device; and a controller coupled to the memory device, wherein the controller is configured to: create a plurality of zones in a backend of the memory device; rank the zones in a list from least utilized area of the backend to most utilized area of the backend; forward at least a part of the list to a host device; and receive a zone open command from the host device.

In another embodiment, a data storage device comprises: memory means; a controller coupled to the memory means, wherein the controller is configured to: recommend a zone to be opened to a host device, wherein recommending a zone comprises providing a list of zones that can be opened to the host device, wherein the list comprises the recommended zone and other zones; and receive a zone open command from the host device to open the recommended zone.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to creating new zones in a data storage device in a manner that ensures substantially even workload of the memory device storage locations. The data storage device can guide a host device to select a particular zone to open in zone namespace (ZNS) systems where the host device selects which zone to open. The data storage device tracks the workload of the various storage locations and create zones. The data storage device then provides selected zones having the least used storage locations with the idea of guiding the host device to select the zone having the least used storage locations. Thus, rather than utilizing a randomly selected unopened zone, the host will select, based upon guidance from the data storage device, zones that contain the least utilized storage location. In so doing, generally even workload of the memory device storage locations is achieved.

Figure 1:
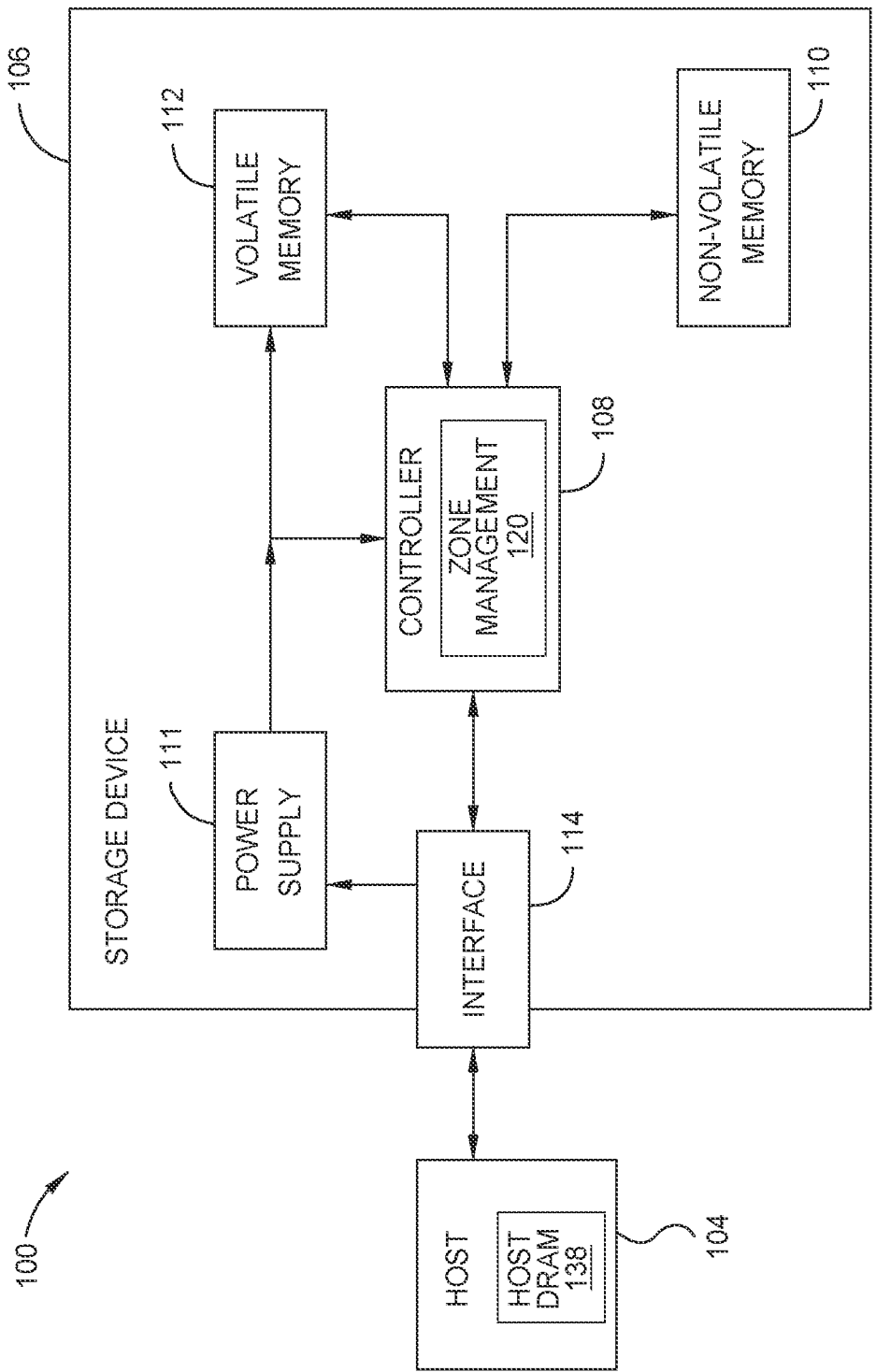
FIG. 1 is a schematic block diagram illustrating a storage system, according to one embodiment.

FIG. 1 is a schematic block diagram illustrating a storage system 100 in which data storage device 106 may function as a storage device for a host device 104, in accordance with one or more techniques of this disclosure. For instance, the host device 104 may utilize non-volatile memory 110 included in data storage device 106 to store and retrieve data. The host device 104 includes a host DRAM 138. In some examples, the storage system 100 may include a plurality of storage devices, such as the data storage device 106, which may operate as a storage array. For instance, the storage system 100 may include a plurality of data storages devices 106 configured as a redundant array of inexpensive/independent disks (RAID) that collectively function as a mass storage device for the host device 104.

The storage system 100 includes the host device 104 which may store and/or retrieve data to and/or from one or more storage devices, such as the data storage device 106. As illustrated in FIG. 1, the host device 104 may communicate with the storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The data storage device 106 includes a controller 108, non-volatile memory 110 (NVM 110), a power supply 111, volatile memory 112, and an interface 114. The controller 108 comprises an internal memory 120 or buffer. In some examples, the data storage device 106 may include additional components not shown in FIG. 1 for sake of clarity. For example, the data storage device 106 may include a printed board (PB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The data storage device 106 includes NVM 110, which may include a plurality of media units or memory devices. NVM 110 may be configured to store and/or retrieve data. For instance, a media unit of NVM 110 may receive data and a message from the controller 108 that instructs the memory device to store the data. Similarly, the media unit of NVM 110 may receive a message from the controller 108 that instructs the memory device to retrieve data. In some examples, each of the media units may be referred to as a die. In some examples, a single physical chip may include a plurality of dies (i.e., a plurality of memory devices). In some examples, each memory devices may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each media unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices. Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The data storage device 106 includes a power supply 111, which may provide power to one or more components of the data storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory 120 before sending the data to the NVM 110.

Figure 2A:
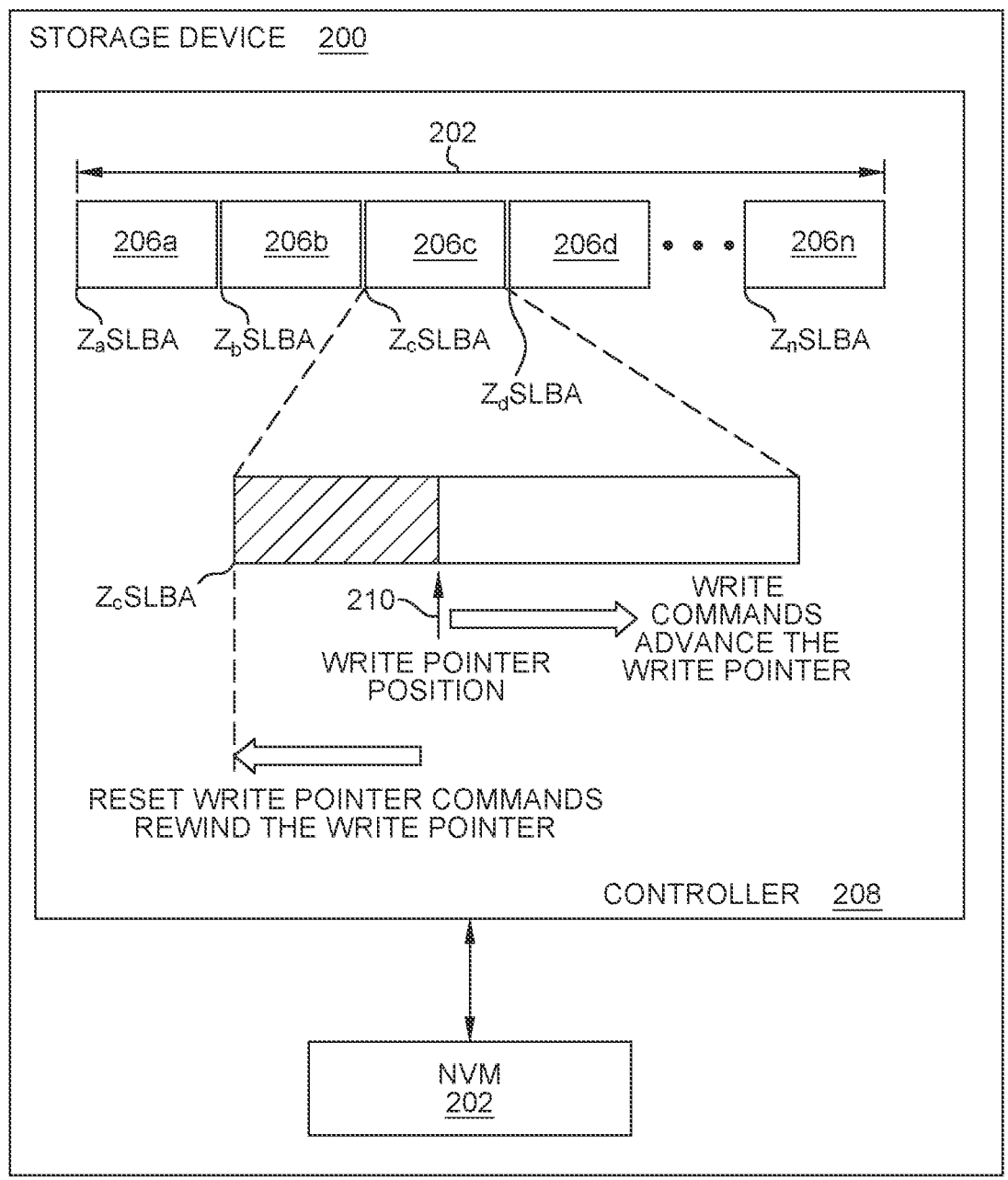
FIG. 2A illustrates zoned namespaces (ZNSs) utilized in a storage device, according to one embodiment.
Figure 2B:
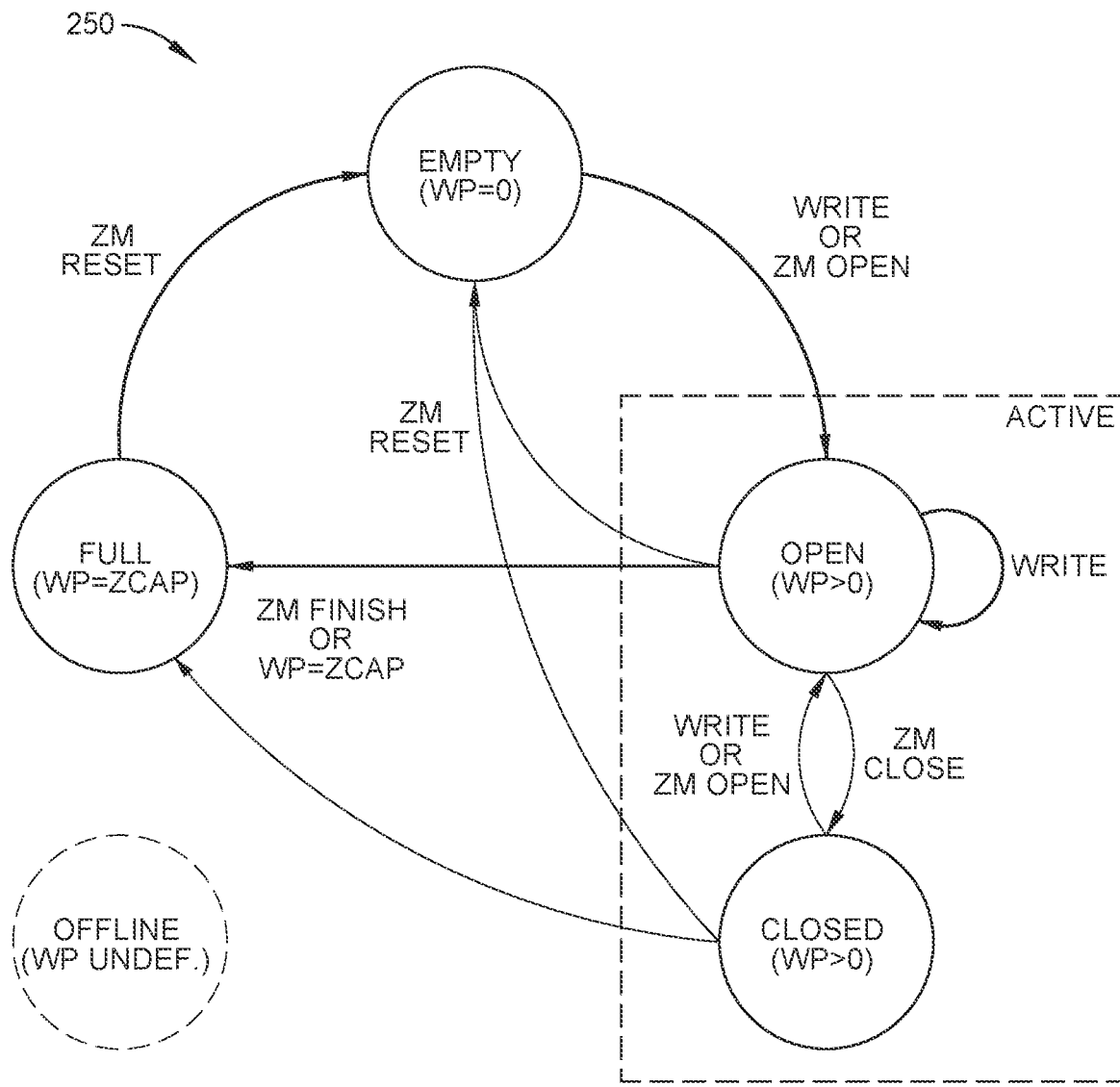
FIG. 2B illustrates a state diagram for the ZNSs of the storage device of FIG. 2A, according to one embodiment.

FIG. 2A illustrates a zoned namespace (ZNS) 202 view utilized in a storage device 200, according to one embodiment. The storage device 200 may present the ZNS 202 view to a host device. FIG. 2B illustrates a state diagram 250 for the ZNS 202 of the storage device 200, according to one embodiment. The storage device 200 may be the data storage device 106 of the storage system 100 of FIG. 1. The storage device 200 may have one or more ZNS 202, and each ZNS 202 may be different sizes. The storage device 200 may further comprise one or more conventional namespaces in addition to the one or more ZNS 202. Moreover, the ZNS 202 may be a zoned block command (ZBC) for SAS and/or a zoned-device ATA command set (ZAC) for SATA.

In the storage device 200, the ZNS 202 is the quantity of NVM that can be formatted into logical blocks such that the capacity is divided into a plurality of zones 206a-206n (collectively referred to as zones 206). Each of the zones 206 comprise a plurality of physical or erase blocks (now shown) of a media unit or NVM 204, and each of the erase blocks are associated a plurality of logical blocks (not shown). When the controller 208 receives a command, such as from a host device (not shown) or the submission queue of a host device, the controller 208 can read data from and write data to the plurality of logical blocks associated with the plurality of erase blocks of the ZNS 202. Each of the logical blocks is associated with a unique LBA or sector.

In one embodiment, the NVM 204 is a NAND device. The NAND device comprises one or more dies. Each of the one or more dies comprises one or more planes. Each of the one or more planes comprises one or more erase blocks. Each of the one or more erase blocks comprises one or more wordlines (e.g., 256 wordlines). Each of the one or more wordlines may be addressed in one or more pages. For example, an MLC NAND die may use an upper page and a lower page to reach the two bits in each cell of the full wordline (e.g., 16 kB per page). Furthermore, each page can be accessed at a granularity equal to or smaller than the full page. A controller can frequently access NAND in user data granularity LBA sizes of 512 bytes. Thus, as referred to in the below description, NAND locations are equal to a granularity of 512 bytes. As such, an LBA size of 512 bytes and a page size of 16 kB for two pages of an MCL NAND results in about 16 NAND locations per wordline. However, the NAND location size is not intended to be limiting, and is merely used as an example.

When data is written to an erase block, one or more logical blocks are correspondingly updated within a zone 206 to track where the data is located within the NVM 204. Data may be written to one zone 206 at a time until a zone 206 is full, or to multiple zones 206 such that multiple zones 206 may be partially full. Similarly, when writing data to a particular zone 206, data may be written to the plurality of erase blocks one block at a time, in sequential order of NAND locations, page-by-page, or wordline-by-wordline, until moving to an adjacent block (i.e., write to a first erase block until the first erase block is full before moving to the second erase block), or to multiple blocks at once, in sequential order of NAND locations, page-by-page, or wordline-by-wordline, to partially fill each block in a more parallel fashion (i.e., writing the first NAND location or page of each erase block before writing to the second NAND location or page of each erase block).

Each of the zones 206 is associated with a zone starting logical block address (ZSLBA). The ZSLBA is the first available LBA in the zone 206. For example, the first zone 206a is associated with $Z_a$SLBA, the second zone 206b is associated with $Z_b$SLBA, the third zone 206c is associated with $Z_c$SLBA, the fourth zone 206d is associated with $Z_d$SLBA, and the $n^{th}$ zone 206n (i.e., the last zone) is associated with $Z_n$SLBA. Each zone 206 is identified by its ZSLBA, and is configured to receive sequential writes (i.e., writing data to the NVM 110 in the order the write commands are received).

As data is written to a zone 206, a write pointer 210 is advanced or updated to point to or to indicate the next available block in the zone 206 to write data to in order to track the next write starting point (i.e., the completion point of the prior write equals the starting point of a subsequent write). Thus, the write pointer 210 indicates where the subsequent write to the zone 206 will begin. Subsequent write commands are 'zone append' commands, where the data associated with the subsequent write command appends to the zone 206 at the location the write pointer 210 is indicating as the next starting point. An ordered list of LBAs within the zone 206 may be stored for write ordering. Each zone 206 may have its own write pointer 210. Thus, when a write command is received, a zone is identified by its ZSLBA, and the write pointer 210 determines where the write of the data begins within the identified zone.

FIG. 2B illustrates a state diagram 250 for the ZNS 202 of FIG. 2A. In the state diagram 250, each zone may be in a different state, such as empty, active, full, or offline. When a zone is empty, the zone is free of data (i.e., none of the erase blocks in the zone are currently storing data) and the write pointer is at the ZSLBA (i.e., WP=0). An empty zone switches to an open and active zone once a write is scheduled to the zone or if a zone open command is issued by the host. Zone management (ZM) commands can be used to move a zone between zone open and zone closed states, which are both active states. If a zone is active, the zone comprises open blocks that may be written to, and the host may be provided a description of recommended time in the active state. The controller may comprise the ZM.

The term "written to" includes programming user data on 0 or more word lines in an erase block, erasure, and/or partially filled word lines in an erase block when user data has not filled all of the available word lines. The term "written to" may further include closing a zone due to internal drive handling needs (open block data retention concerns because the bits in error accumulate more quickly on open erase blocks), the storage device 200 closing a zone due to resource constraints, like too many open zones to track or discovered defect state, among others, or a host device closing the zone for concerns such as there being no more data to send the drive, computer shutdown, error handling on the host, limited host resources for tracking, among others.

The active zones may be either open or closed. An open zone is an empty or partially full zone that is ready to be written to and has resources currently allocated. The data received from the host device with a write command or zone append command may be programmed to an open erase block that is not currently filled with prior data. New data pulled-in from the host device or valid data being relocated may be written to an open zone. Valid data may be moved from one zone (e.g. the first zone 202a) to another zone (e.g. the third zone 202c) for garbage collection purposes. A closed zone is an empty or partially full zone that is not currently receiving writes from the host in an ongoing basis. The movement of a zone from an open state to a closed state allows the controller 208 to reallocate resources to other tasks. These tasks may include, but are not limited to, other zones that are open, other conventional non-zone regions, or other controller needs.

In both the open and closed zones, the write pointer is pointing to a place in the zone somewhere between the ZSLBA and the end of the last LBA of the zone (i.e., WP>0). Active zones may switch between the open and closed states per designation by the ZM, or if a write is scheduled to the zone. Additionally, the ZM may reset an active zone to clear or erase the data stored in the zone such that the zone switches back to an empty zone. Once an active zone is full, the zone switches to the full state. A full zone is one that is completely filled with data, and has no more available blocks to write data to (i.e., WP=zone capacity (ZCAP)). Read commands of data stored in full zones may still be executed.

The ZM may reset a full zone, scheduling an erasure of the data stored in the zone such that the zone switches back to an empty zone. When a full zone is reset, the zone may not be immediately cleared of data, though the zone may be marked as an empty zone ready to be written to. However, the reset zone must be erased prior to switching to an active zone. A zone may be erased any time between a ZM reset and a ZM open. An offline zone is a zone that is unavailable to write data to. An offline zone may be in the full state, the empty state, or in a partially full state without being active.

Since resetting a zone clears or schedules an erasure of the data stored in the zone, the need for garbage collection of individual erase blocks is eliminated, improving the overall garbage collection process of the storage device 200. The storage device 200 may mark one or more erase blocks for erasure. When a new zone is going to be formed and the storage device 200 anticipates a ZM open, the one or more erase blocks marked for erasure may then be erased. The storage device 200 may further decide and create the physical backing of the zone upon erase of the erase blocks. Thus, once the new zone is opened and erase blocks are being selected to form the zone, the erase blocks will have been erased. Moreover, each time a zone is reset, a new order for the LBAs and the write pointer 210 for the zone 206 may be selected, enabling the zone 206 to be tolerant to receive commands out of sequential order. The write pointer 210 may optionally be turned off such that a command may be written to whatever starting LBA is indicated for the command.

Referring back to FIG. 2A, when the controller 208 initiates or pulls-in a write command, the controller 208 may select an empty zone 206 to write the data associated with the command to, and the empty zone 206 switches to an active zone 206. As used herein, the controller 208 initiating or pulling-in a write command comprises receiving a write command or direct memory access (DMA) reading the write command. The write command may be a command to write new data, or a command to move valid data to another zone for garbage collection purposes. The controller 208 is configured to DMA read or pull-in new commands from a submission queue populated by a host device.

In an empty zone 206 just switched to an active zone 206, the data is written to the zone 206 starting at the ZSLBA, as the write pointer 210 is indicating the logical block associated with the ZSLBA as the first available logical block. The data may be written to one or more erase blocks or NAND locations that have been allocated for the physical location of the zone 206. After the data associated with the write command has been written to the zone 206, the write pointer 210 is updated to point to the next available block in the zone 206 to track the next write starting point (i.e., the completion point of the first write). Alternatively, the controller 208 may select an active zone to write the data to. In an active zone, the data is written to the logical block indicated by the write pointer 210 as the next available block.

In some embodiments, a NAND location may be equal to a wordline. In such an embodiment, if the write command is smaller than a wordline, the controller may optionally aggregate several write commands in another memory location such as DRAM or SRAM prior to programming a full wordline composed of multiple write commands. Write commands that are longer than a wordline will be able to program and fill a complete wordline with some of the data, and the excess data beyond a wordline will be used to fill the next wordline. However, a NAND location is not limited to being equal to a wordline, and may have a larger or smaller size than a wordline. For example, in some embodiments, a NAND location may be equal to the size of a page.

For example, the controller 208 may receive, pull-in, or DMA read a first write command to a third zone 206c, or a first zone append command. The host identifies sequentially which logical block of the zone 206 to write the data associated with the first command to. The data associated with the first command is then written to the first or next available LBA(s) in the third zone 206c as indicated by the write pointer 210, and the write pointer 210 is advanced or updated to point to the next available LBA available for a host write (i.e., WP>0). If the controller 208 receives or pulls-in a second write command to the third zone 206c, the data associated with the second write command is written to the next available LBA(s) in the third zone 206c identified by the write pointer 210. Once the data associated with the second command is written to the third zone 206c, the write pointer 210 once again advances or updates to point to the next available LBA available for a host write. Resetting the third zone 206c moves the write pointer 210 back to the $Z_cSLBA$ (i.e., WP=0), and the third zone 406c switches to an empty zone.

Figure 3:
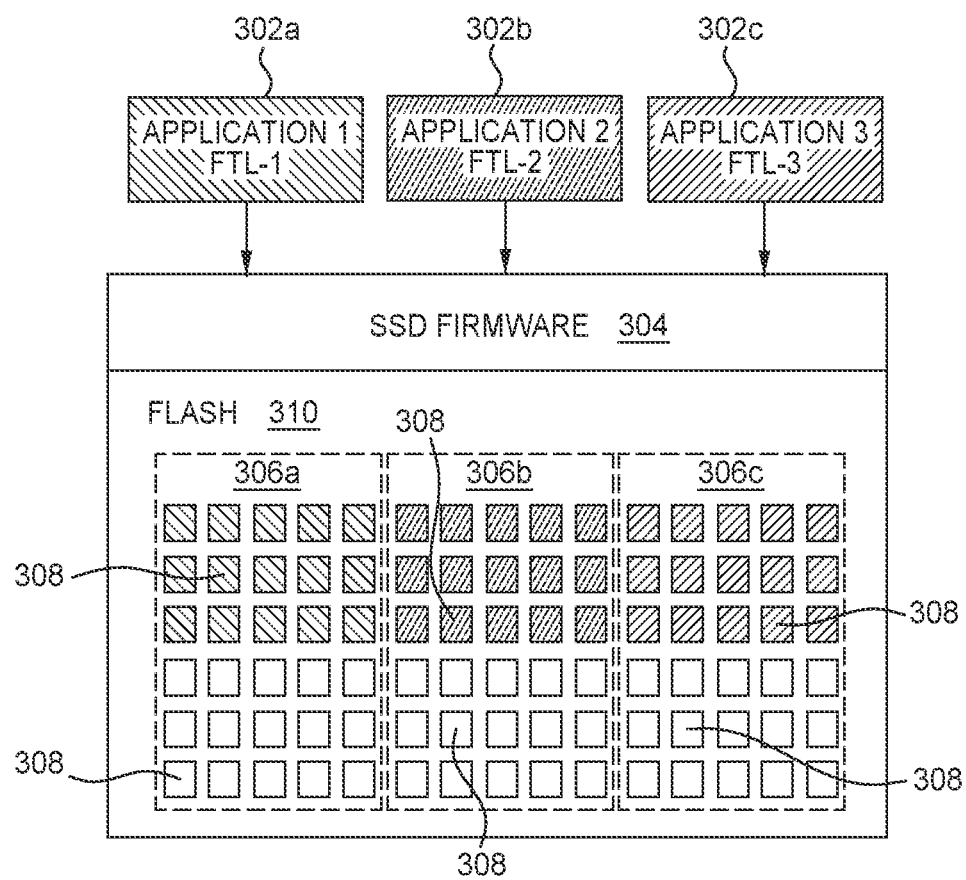
FIG. 3 illustrates a NVMe set/endurance group in a ZNS system according to one embodiment.

FIG. 3 illustrates a NVMe set/endurance group in a ZNS system according to one embodiment. As shown in FIG. 3, a plurality of applications 302a-302c connect to the data storage device firmware 304 through respective flash transition layers (FTLs) to access the memory devices 306a-306c that each comprise a plurality of dies 308. In operation, each application, which could be different hosts of virtual hosts, has access to the same data storage device 310 and hence, memory devices 306a-306c and dies 308. The zones for a ZNS device can be set up across the dies 308 or within any die 308.

In ZNS, a zone open command occurs when the first write triggers the logic that allocates a new zone. The zone write occurs when the start LBA (SLBA) is equal to the zone start LBA (ZSLBA). Similarly, a zone append/write command is where the SLBA does not equal ZSLBA such that the writes are added to an already opened zone.

It is to be understood that backend units include physical blocks in the ZNS NVMe set/endurance group. In general, a ZNS device looks for zone append and zone read commands in a submission queue and prioritizes those commands to the backend without any conditions. However, for zone open commands, the zones are created using backend units that are not currently in use by other zones. If those zones are created randomly or utilizing the same dies over time, then the dies do not receive an even workload and hence, the ZNS device has uneven workload, impacting QoS. It is desirable to create a zone where the workload in terms of die/FIM is least utilized so that each time a new zone is created, the zone utilizes the least utilized die/FIM so that the device has an even workload and even wear over time. The intention is to make the zone open command use the leftover backend resources due to non-dependency on exact hardware (HW). In other words, the disclosure involves dissimilar prioritization for writes into zones based on the zone offset. The controller utilizes the non-attachment of the device resources until the zone start for writing. Subsequently, the zone mapping is updated for the new zone with allocated physical blocks as in a typical ZNS system.

The zone append and zone read commands are non-negotiable candidates in terms of a particular resource workload. That is, when a zone read is issued, the zone read can only be read from the particular die/FIM (physical block in that ZNS NVMe set/endurance group) where the data is written. Similarly, for a zone append, the zone can be appended to only that particular zone where the write was previously started (already open physical block is in use).

Zone open commands, on the other hand, are cases where the ZNS hosts wants to write data from zero zone offset (zone create to start with) to the device, and the host does not care where those data physically reside, as long as the zone is part of the NVMe set/endurance group and that the zone to physical (Z2P) mapping is intact. The ZNS controller can leverage the condition.

In certain situations, the host device not only instructs the data storage device to open a new zone, but also specifically instructs which zone to open. As discussed herein, the data storage device can recommend or suggest which zone to open. More specifically, the data storage device triggers an automatic zone selection process where the host device gives the data storage device a set of priorities and expected workloads and the data storage device in turn provides an empty zone map as to which future zones will be ideal rather than selecting one on its own. For example, in a high priority write request, the host device may choose an appropriate zone from a list of zones provided by the data storage device for corresponding use cases.

The ZNS device (i.e., data storage device) populates an empty zone map with appropriate ranking on least utilized, with zero write offsets (i.e., potential new zones) backend memory devices and/or memory device areas. In one embodiment, a program-erase parameter is used to determine which zone to open. The program-erase parameter is used when there is a 'tie' in terms of workload history such that there are multiple zones that could be open that have the same workload history in terms of die, FIM, cache, and/or error correction engine workload. In so doing, the zone with the fewest program-erase cycles is chosen. Thus, wear leveling across the blocks is achieved. The mapping for a zone open command is populated with those backend units (i.e., physical blocks in the ZNS NVMe set/endurance group) where the workload in terms of die/FIM is least utilized in sync with the provided flowchart. The ZNS device selects the appropriate empty zone from the set of available zones in the zone map and issues a zone open to the device.

Figure 4:
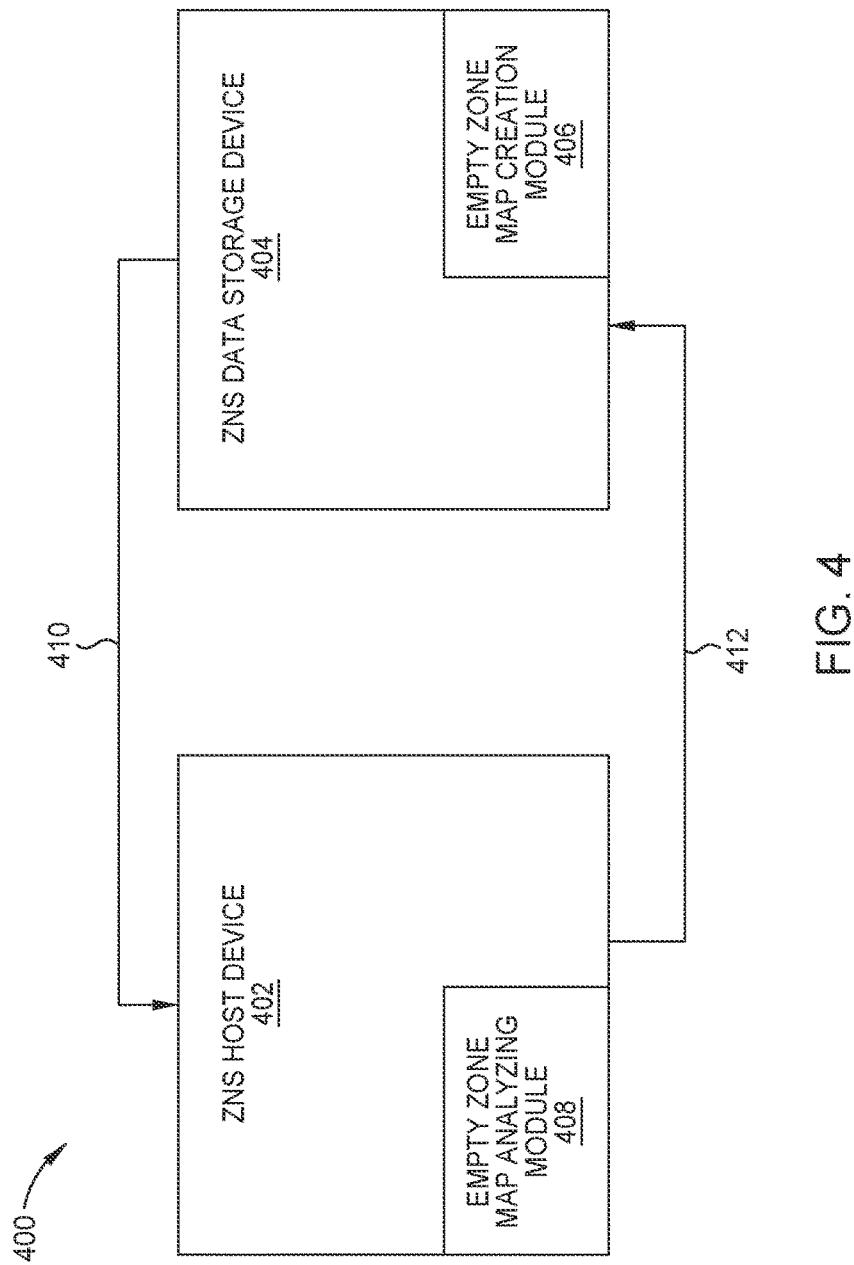
FIG. 4 illustrates a ZNS system for efficient backend utilization according to one embodiment.

FIG. 4 illustrates a ZNS system 400 for efficient backend utilization according to one embodiment. As shown in FIG. 4, the ZNS data storage device 404 is coupled to a ZNS host device 402. The ZNS data storage device 404 includes an empty zone map creation module 406, and the ZNS host device 402 comprises an empty zone map analyzing module 408. The empty zone map creation module 406 creates and maintains an empty zone map based on the write offsets and backend loads. The empty zone map may include different maps for different configurations. The ZNS data storage device 404 shares the maps 410 with the ZNS host device 402 where the empty zone map analyzing module 408 determines which zone from the maps would be best for the next zone open command. The ZNS host device 402 then sends to the ZNS data storage device 404 a zone open command with wordline request in the appropriate backend based on the ZNS data storage device 404 hinted zone map 412. It is to be understood that the ZNS host device 402 may not have an empty zone map analyzing module 408 and thus, simply instructs the ZNS data storage device 404 to open a specific zone from the zone map.

ZNS, as a technology, does not differentiate between die layouts, but rather, on the lines of higher and lower performance. If some zones were allocated to a specific die or die group, then the die layouts can be a factor in empty zone map. For example, multiple empty zone maps can be populated for different interleaving configurations, such as 1 DIL or 2 DIL (die interleaving), which itself is created for different performances. In some cases, zone maps can also be populated with zones made up only of worn-out old blocks collected from various dies, which allows the host device a holistic view of the data storage device to enable the host device to make better decisions for zone creation for variable purposes (i.e., input/output, garbage collection, or word lines). Along with the write-offsets based mapping, the device may also incorporate program-erase cycles of different blocks in the backend logic to populate the empty zone map such that wear leveling of those zones is also honored. Such a logic minimizes unwanted data transfers from zone to zone at a later point.

The workload of the storage backend unit (i.e., die/FIM) in any ZNS NVMe set is associated with a credit point according to the read/write activity, and a moving window to decide on a zone open at any point in time. Any known methods, either firmware (FW) or HW may be employed by the data storage device to evaluate such workloads. Counter based FW methods for different resources is one example. Stated another way, wear leveling schemes may be accommodated during the process wherein if the controller determines that multiple backend units are eligible for zone open in terms of least workload, the unit offering the physical block with a lower program-erase count may be the winner for selection as the new zone to open. Over a long run, such a strategy will provide better sustained mixed load performance as well as better wear leveling. The same logic is applicable to read scrub operations, failure management, and other storage backend management techniques. The controller chooses a destination block in the backend unit of a NVMe set of a ZNS device which has the least workload for HW and lower program-erase block attached to that set. The controller does the selection after all the host issued ZNS appends and ZNS reads are prioritized.

As noted above, uneven wear in a data storage device can be an issue. Wear leveling ensures efficient use of the device, longer device lifetime, and good QoS. As discussed herein, for a ZNS device, a way to ensure wear leveling is processing a zone open command to open zones that have the least utilized memory devices. The zone open command differs from the zone read command and the zone append command. Both the zone read command and the zone append command are commands that are performed on already opened zones. Already opened zones have memory devices or areas of memory devices that are already allocated thereto. New zones, on the other hand, can be created from memory devices or areas of memory devices that are not currently in allocated to a zone. The devices or areas not currently allocated to a zone can be evaluated to determine which devices or areas have the least amount of workload history. New zones can be created from the areas or devices that have the least amount of workload history. Number of program-erase cycles can be used as a tiebreaker for any areas or devices that have the same amount of workload history.

Figure 5:
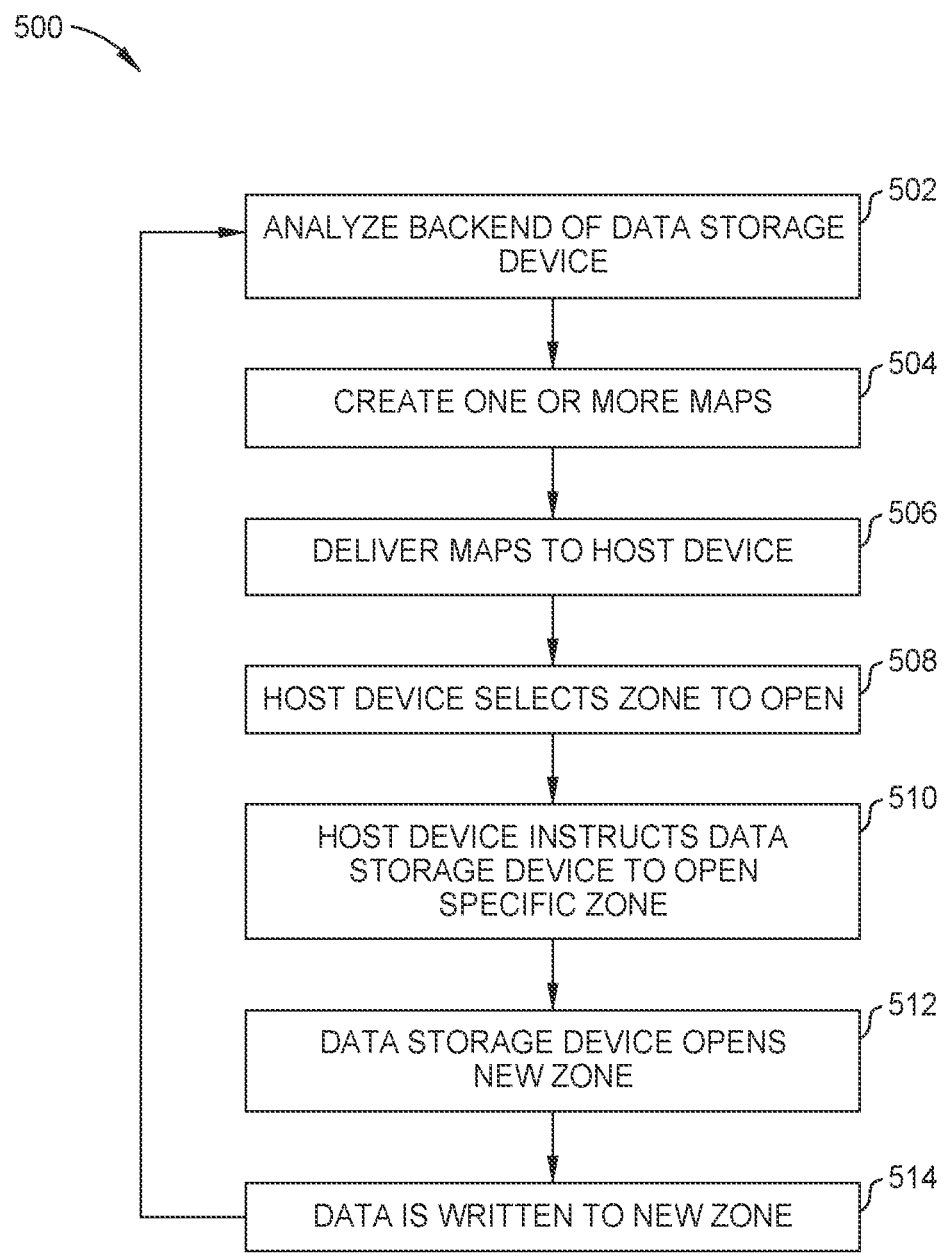
FIG. 5 is a flowchart illustrating efficient backend utilization of a ZNS device.

FIG. 5 is a flowchart 500 illustrating efficient backend utilization of a ZNS device. Initially, the data storage device analyzes the backend of the data storage device 502 to determine workload of the memory devices, memory dies, and memory areas of the memory dies. It is to be understood that the memory areas include pages, planes, and blocks of the memory dies.

After analyzing the backend of the data storage device, the empty zone map creation module creates one or more maps 504 based upon the available memory locations. The maps contain potential zones that may be opened upon instruction from the host device. The maps may include not only the potential zones, but also the particular configurations for which the potential zones may be ideal. For the potential zones, the potential zones are created based upon historical workload. For the particular configurations, such configurations may include high performance levels and low performance levels. In one embodiment, the maps do not include all potential zones that can be created. As the maps are to hint or suggest to the host device the specific zone to open, in order to influence the host device's selection, the data storage device can include less than all potential zones in the maps.

Once the maps are created, the maps are delivered to the host device 506. The host device then selects a particular zone to create 508 and instructs the data storage device 510. The data storage device then opens the zone 512 and writes data to the new zone 514. The data storage device then reanalyzes the backend and repeats the process.

By taking into consideration the backend workload and creating potential zone creation maps, the data storage device can hint or suggest to the host device which zone should be opened next. By hinting or suggesting to the host device, and having the host device following the suggestion or hint, memory device wear leveling can be achieved which improves memory device lifetime and quality of service (QoS).

In one embodiment, a data storage device comprises: a memory device; and a controller coupled to the memory device, wherein the controller is configured to: create an empty zone map, wherein the empty zone map ranks zones within the empty zone map from least utilized to most utilized; send the empty zone map to a host device; and receive a zone open command from the host device. The empty zone map comprises at least one zone that has die interleaving. The empty zone map comprises zones made from worn-out blocks of the memory device. The controller is further configured to receive a set of priorities and expected workloads from the host device. The controller is further configured to create the empty zone map after receiving the set of priorities and expected workloads from the host device. The empty zone map is additionally ranked based upon number of program-erase cycles for memory blocks within the memory device.

In another embodiment, a data storage device comprises: a memory device; and a controller coupled to the memory device, wherein the controller is configured to: create a plurality of zones in a backend of the memory device; rank the zones in a list from least utilized area of the backend to most utilized area of the backend; forward at least a part of the list to a host device; and receive a zone open command from the host device. The controller is configured to receive zone append commands, zone read commands, and the zone open command, wherein the commands are evaluated for priority of processing. The evaluation occurs at a flash translation layer (FTL). The zone open command is a zone command with zero offset. The controller is further configured to update a zone to logical block address table after opening a new zone. The controller is further configured to route zone read commands and zone append commands to the backend prior to opening a new zone. The part of the list comprises a zone from the least utilized area of the backend.

In another embodiment, a data storage device comprises: memory means; a controller coupled to the memory means, wherein the controller is configured to: recommend a zone to be opened to a host device, wherein recommending a zone comprises providing a list of zones that can be opened to the host device, wherein the list comprises the recommended zone and other zones; and receive a zone open command from the host device to open the recommended zone. The recommended zone has a lower workload history compared to the other zones. The lower workload history is based upon die workload, flash interface module (FIM) workload, cache workload, and/or parity check engine workload. The recommended zone has a same workload history compared to at least one other zone of the other zones. The recommended zone has undergone a fewer program-erase cycles compared to the at least one other zone. The controller is further configured to maintain wear leveling across physical blocks of the memory means. The recommending occurs prior to the receiving.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
   create an empty zone map, wherein the empty zone map ranks zones within the empty zone map from least utilized to most utilized;
   send the empty zone map to a host device;
   receive a zone open command from the host device; and
   receive a set of priorities and expected workloads from a host device.

2. The data storage device of claim 1, wherein the empty zone map comprises at least one zone that has die interleaving.

3. The data storage device of claim 1, wherein the empty zone map comprises zones made from worn-out blocks of the memory device.

4. The data storage device of claim 1, wherein the controller is further configured to exclude one or more potential zones that can be created in the zone map.

5. The data storage device of claim 1, wherein the controller is further configured to create the empty zone map after receiving the set of priorities and expected workloads from the host device.

6. The data storage device of claim 1, wherein the empty zone map is additionally ranked based upon number of program-erase cycles for memory blocks within the memory device.

7. A data storage device, comprising:
   a memory device; and
   a controller coupled to the memory device, wherein the controller is configured to:
   create a plurality of zones in a backend of the memory device;
   rank the zones in a list from least utilized area of the backend to most utilized area of the backend;
   forward at least a part of the list to a host device;
   receive a zone open command from the host device; and
   receive a set of priorities and expected workloads from the host device.

8. A data storage device, comprising:
   a memory device; and
   a controller coupled to the memory device, wherein the controller is configured to:
   create a plurality of zones in a backend of the memory device;
   rank the zones in a list from least utilized area of the backend to most utilized area of the backend;
   forward at least a part of the list to a host device;
   receive a zone open command from the host device; and
   receive zone append commands, zone read commands, and the zone open command, wherein the commands are evaluated for priority of processing.

9. The data storage device of claim 8, wherein the evaluation occurs at a flash translation layer (FTL).

10. The data storage device of claim 7, wherein the zone open command is a zone command with zero offset.

11. The data storage device of claim 8, wherein the controller is further configured to update a zone to logical block address table after opening a new zone.

12. The data storage device of claim 7, wherein the controller is further configured to route zone read commands and zone append commands to the backend prior to opening a new zone.

13. The data storage device of claim 7, wherein the part of the list comprises a zone from the least utilized area of the backend.

14. A data storage device, comprising:
    memory means;
    a controller coupled to the memory means, wherein the controller is configured to:
    recommend a zone to be opened to a host device, wherein recommending a zone comprises providing a list of zones that can be opened to the host device, wherein the list comprises the recommended zone and other zones;
    receive a zone open command from the host device to open the recommended zone; and
    receive a set of priorities and expected workloads from the host device.

15. The data storage device of claim 14, wherein the recommended zone has a lower workload history compared to the other zones.

16. The data storage device of claim 15, wherein the lower workload history is based upon die workload, flash interface module (FIM) workload, cache workload, and/or parity check engine workload.

17. The data storage device of claim 14, wherein the recommended zone has a same workload history compared to at least one other zone of the other zones.

18. The data storage device of claim 17, wherein the recommended zone has undergone a fewer program-erase cycles compared to the at least one other zone.

19. The data storage device of claim 14, wherein the controller is further configured to maintain wear leveling across physical blocks of the memory means.

20. The data storage device of claim 14, wherein the recommending occurs prior to the receiving.

* * * * *